United States Patent
Kakoi et al.

(10) Patent No.: US 8,330,985 B2
(45) Date of Patent: Dec. 11, 2012

(54) IMAGE FORMING DEVICE

(75) Inventors: Akihiro Kakoi, Kanagawa (JP); Tetsuo Asakawa, Tokyo (JP); Miki Kouchi, Kanagawa (JP); Rie Nakamura, Kanagawa (JP); Yoshinori Furuichi, Kanagawa (JP); Daisuke Noguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1002 days.

(21) Appl. No.: 11/870,198

(22) Filed: Oct. 10, 2007

(65) Prior Publication Data

US 2008/0252930 A1   Oct. 16, 2008

(30) Foreign Application Priority Data

Oct. 13, 2006   (JP) ................................. 2006-280674

(51) Int. Cl.
*G06K 15/00* (2006.01)
*G06F 3/12* (2006.01)
(52) U.S. Cl. ................... 358/1.16; 358/1.15; 358/1.1
(58) Field of Classification Search .................. None
See application file for complete search history.

(56) References Cited

U.S. PATENT DOCUMENTS

| 2002/0067492 | A1* | 6/2002 | Ueda ................................ 358/1.9 |
| 2003/0220110 | A1* | 11/2003 | Kizu et al. ....................... 455/445 |
| 2005/0088709 | A1* | 4/2005 | Kizaki et al. ................... 358/501 |

FOREIGN PATENT DOCUMENTS

| JP | 2003-87538 | 3/2003 |
| JP | 2003-234881 | 8/2003 |
| JP | 2004-104749 | 4/2004 |

* cited by examiner

*Primary Examiner* — Vincent Rudolph
*Assistant Examiner* — Marcus T Riley
(74) *Attorney, Agent, or Firm* — Oblon, Spivak, McClelland, Maier & Neustadt, L.L.P.

(57) ABSTRACT

An image forming device is disclosed that is able to prevent halt of operations due to full memory occupation, and prevent the full occupation of the memory. The image forming device includes a reading unit; an image data storage unit; a vacancy waiting unit that, when allocating a storage area for storing image data in the image data storage unit, waits until the storage size of a vacancy in the image data storage unit becomes greater than a predetermined value when allocation of the storage area fails; a failure processing unit that, when allocating the storage area for storing the image data in the image data storage unit, performs failure processing when allocation of the storage area fails; and a control unit that controls one of the vacancy waiting unit and the failure processing unit according to image forming conditions in the image forming device.

6 Claims, 12 Drawing Sheets

FIG.12

| Copy Conditions In Memory Allocation Failure | messages |
|---|---|
| two-side mode | Memory is full.<br>Please change to one-side mode. |
| stack mode | Memory is full.<br>Please change to sort mode. |
| collective mode | Memory is full.<br>Please cancel collective mode. |

IMAGE FORMING DEVICE

CROSS-REFERENCE TO RELATED APPLICATIONS

The present patent application claims priority under 35 U.S.C. §119 from Japanese Patent Application No. 2006-280674, filed on Oct. 13, 2006 in the Japan Patent Office, the contents and disclosures of which are hereby incorporated by reference herein in their entirety.

BACKGROUND OF THE INVENTION

1. Field of the Invention

The present invention relates to an image forming device.

2. Description of the Related Art

In copiers or other image forming devices of the related art, once image data for forming an image are all stored in a memory, image forming processing is performed on the stored image data. In this case, in order to realize functions of processing data equivalent to plural pages (for example, a sorting function), it is necessary to have a storage size for storing the data equivalent to plural pages. However, for an image forming device having a small storage size, the number of pages able to be stored is limited, and when reading a manuscript, capacity overflow may occur, which may interrupt the image forming process. For this reason, it is difficult to effectively realize the sorting function, and the needs of users cannot be satisfied.

In order to solve this problem, various developments have been made in the related art to improve effective utilization of the storage size of an image forming device having a small storage size.

For example, Japanese Laid Open Patent Application No. 2003-87538 (hereinafter, referred to as "reference 1") discloses a technique of a communication device which confirms the residual memory size while storing image data, stops data reading operations before the memory is full, and waits for a certain period until the residual memory size increases. Specifically, before reading data from each page, the residual size of a page-memory is compared to a preset value, and when the page-memory residual size is less than the preset value the reading operations are stopped until the residual size of the page-memory becomes larger than the preset value; then, when the residual size of the page-memory becomes larger than the preset value, alternatively, when the residual size of the page-memory is still less than the preset value even after a preset time period elapses, the reading operations are resumed for memory transmission reservation. Therefore, when storing the transmitted data in a memory, it is possible to prevent termination of operations due to errors caused when the memory becomes full. Thus, it is possible to reduce the workload of operators.

However, in the technique disclosed in reference 1, since the system continues to wait as long as the residual memory size is less than the preset value, for example, during copying operations, a problem may occur that the copying operations may be halted if the memory does not have a sufficient vacancy for a long time, namely, the system is trapped by the condition that the memory does not have a vacancy sufficiently larger than the preset value, and the system is halted.

SUMMARY OF THE INVENTION

The present invention may solve one or more problems of the related art.

A preferred embodiment of the present invention may provide an image forming device able to prevent halt of operations due to full occupation of a memory thereof, and able to prevent the full occupation of the memory.

According to a first aspect of the present invention, there is provided an image forming device, comprising:

a reading unit that reads image data;

an image data storage unit that stores the image data obtained by the reading unit;

a vacancy waiting unit that, when allocating a storage area for storing the image data in the image data storage unit, waits until a storage size of a vacancy in the image data storage unit becomes greater than a predetermined value when allocation of the storage area fails;

a failure processing unit that, when allocating the storage area for storing the image data in the image data storage unit, performs failure processing when allocation of the storage area fails; and a control unit that controls one of the vacancy waiting unit and the failure processing unit according to image forming conditions in the image forming device.

According to the present invention, the method for allocating a storage area changes according to the image forming conditions. Hence, it is possible to prevent halt of operations due to full occupation of a memory, and able to prevent the full occupation of the memory.

As an embodiment, the image forming device has a one-side printing mode and a two-side printing mode, the control unit selects the vacancy waiting unit when the image forming device is set in the one-side printing mode, and the image forming condition of the image forming device is set for the two-side printing and the image data are to be printed on a front side; and the control unit selects the failure processing unit when the image forming device is in the two-side printing mode and the image data are to be printed on a back side.

According to the embodiment, the method for allocating a storage area changes according to the printing modes. Hence, it is possible to prevent halt of operations due to full occupation of a memory, and able to prevent the full occupation of the memory.

As an embodiment, the image forming device has a sort mode and a stack mode, the control unit selects the vacancy waiting unit when the image forming device is in the stack mode, and the control unit selects the failure processing unit when the image forming device is in the sort mode.

According to the embodiment, the method for allocating a storage area changes depending on the sort mode and the stack mode. Hence, it is possible to prevent halt of operations due to full occupation of a memory, and able to prevent the full occupation of the memory.

As an embodiment, the image forming device has a collective mode for collecting and outputting the image data, the control unit selects the vacancy waiting unit when an image to be read is the first one of images to be collected, and the control unit selects the failure processing unit when an image to be read is not the first one of the images to be collected.

According to the embodiment, the method for allocating a storage area changes in the collective mode. Hence, it is possible to prevent halt of operations due to full occupation of a memory, and able to prevent the full occupation of the memory.

These and other objects, features, and advantages of the present invention will become more apparent from the following detailed description of preferred embodiments given with reference to the accompanying drawings.

BRIEF DESCRIPTION OF THE DRAWINGS

FIG. 12 is a table illustrating the operations of the failure processing unit 313 according to the embodiment of the present invention.

DESCRIPTION OF THE PREFERRED EMBODIMENTS

Below, preferred embodiments of the present invention are explained with reference to the accompanying drawings.

In the following descriptions, a printer is used as an example of the image forming device of the present invention. Certainly, the present invention is applicable to other kinds of image forming devices.

Device Configuration

First, a configuration of an image forming device according to an embodiment of the present invention is described.

Figure 1:
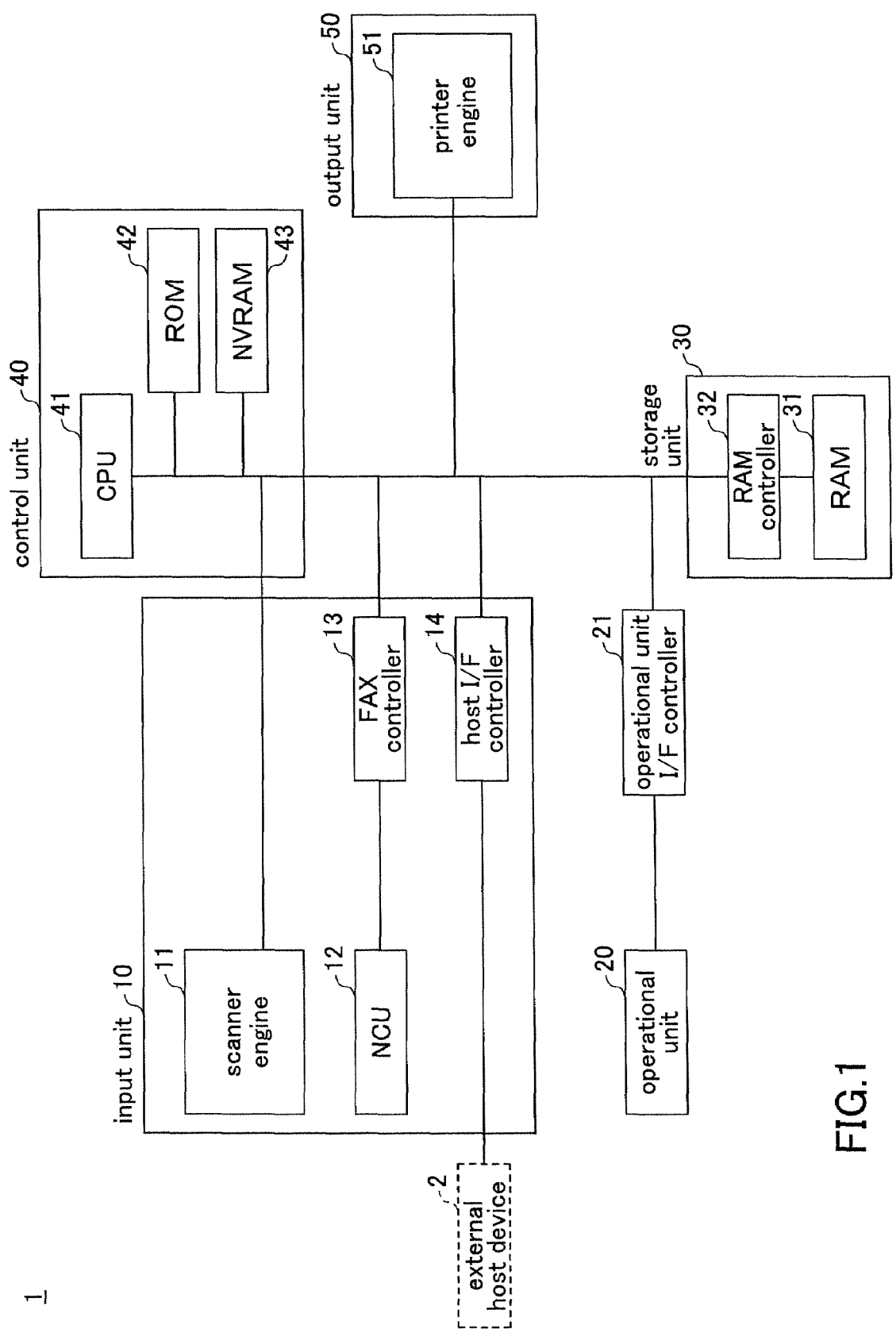
FIG. 1 is a block diagram illustrating an example of a configuration of a printer 1, as an example of the image forming device according to an embodiment of the present invention.

FIG. 1 is a block diagram illustrating an example of a configuration of a printer 1, as an example of the image forming device according to an embodiment of the present invention.

As shown in FIG. 1, the printer 1 includes an input unit 10, an operational unit 20, a storage unit 30, a control unit 40, and an output unit 50.

The input unit 10 is a device for inputting image data used for image formation. The input unit 10 includes a scanner engine 11, an NCU 12, a FAX controller 13, and a host I/F (Interface) controller 14. The scanner engine 11 has copying and scanning functions, and is used for inputting image data from a manuscript.

The NCU 12 is used for connecting the printer 1 to a PSTN (Public Switched Telephone Network). For example, when the printer 1 has functions of a facsimile machine, the printer 1 facsimiles a manuscript through the NCU 12. The facsimiled data (usually coded data) are decoded by the FAX controller 13.

The FAX controller 13 decodes printing data received from the NCU 12.

for example, the host I/F (Interface) controller 14 receives printing data from an external host device 2. The I/F (Interface) may include those for local connection, like IEEE 1284, USB, and those for radio Ethernet network connection or other network connections.

The operational unit 20 is an interface for an operator to operate the printer 1; for example, it may be an LED or LCD display or a speaker, or other indicators for indicating status of the printer 1, or buttons for operating the printer 1. The operational unit 20 inputs or outputs information through an operational unit I/F controller 21. The operational unit I/F controller 21 controls information input to and output from the operational unit 20.

The storage unit 30 stores various kinds of data, such as image data. The storage unit 30 includes a RAM 31 and a RAM controller 32.

The RAM 31 is a storage device for temporarily storing data processed by a CPU 41 and various kinds of controllers.

Here, the term "data" may include the image data and various kinds of application programs.

The RAM controller 32 controls the RAM 31.

The control unit 40 controls the overall operations of the printer 1. The control unit 40 includes the CPU 41, a ROM 42, and an NVRAM 43.

The CPU 41 controls operations of the printer 1 according to control programs stored in the RAM 31 and the ROM 42.

The ROM 42 stores control programs for controlling the printer 1. Plural ROMs 42 may be provided to improve processing performance.

The NVRAM 43 is a non-volatile memory, and is used for storing intrinsic information of the printer 1. For example, the NVRAM 43 may store counts of copied sheets.

The output unit 50 is a device for outputting images obtained by the image forming process. The output unit 50 includes a printer engine 51.

The printer engine 51 is a device for outputting printing results, and may form images by using lasers, LEDs, or by inkjet.

According to the above configuration, in the printer 1, image data input via the input unit 10 are stored in the storage unit 30. The image data stored in the storage unit 30 are output from the output unit 50. In addition, in the present embodiment, when the image data input via the input unit 10 are stored in the storage unit 30, the method of allocating a storage area in the storage unit 30 can be changed responsive to image forming conditions of the printer 1, such as depending on what the printing mode of the printer 1 is, the one-side printing mode or the two-side printing mode. Functional configurations of the printers for realizing this object are described below.

Functional Configuration

First, a configuration of an image forming device according to an embodiment of the present invention is described.

Figure 2:
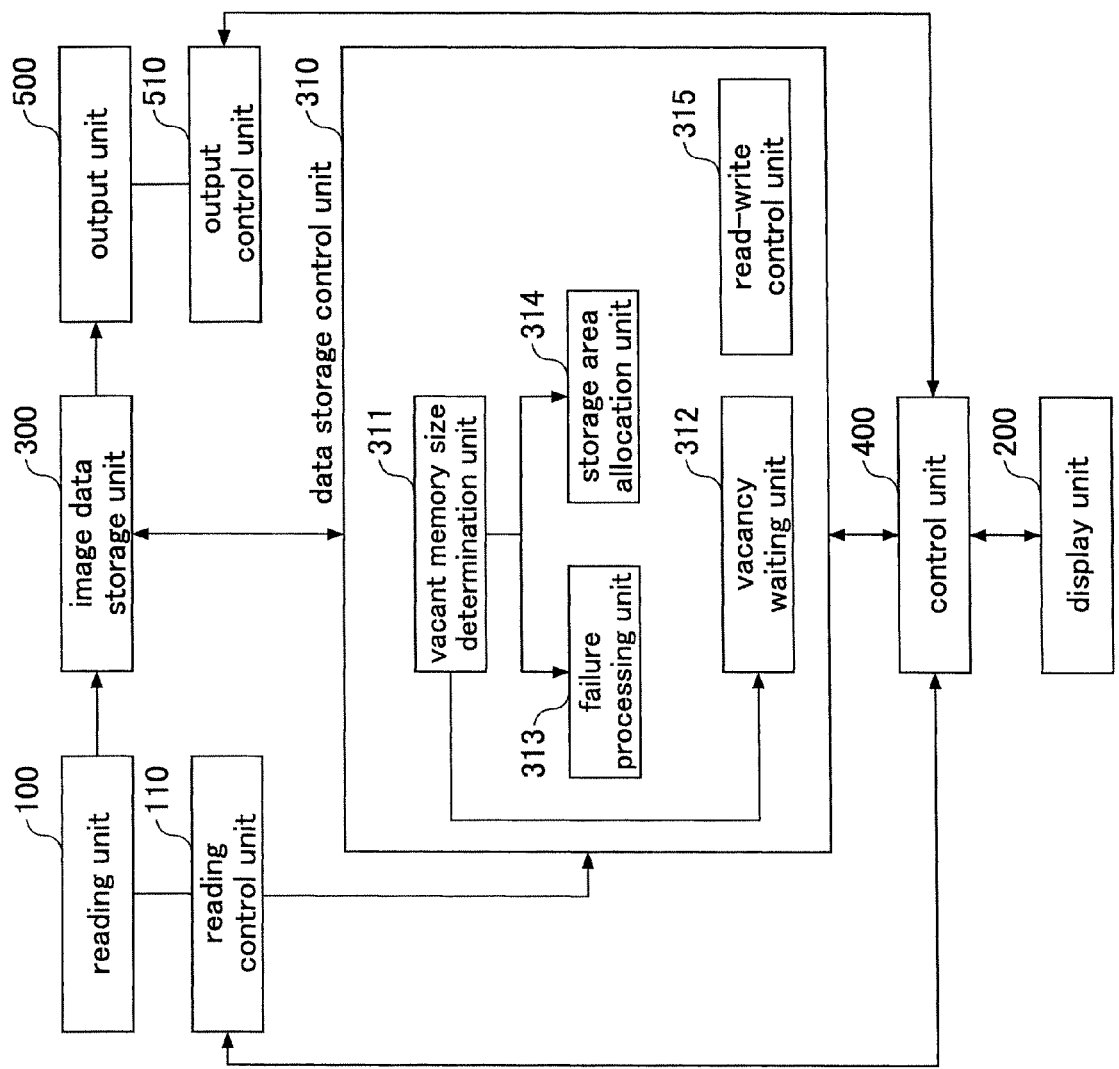
FIG. 2 is a block diagram illustrating an example of functions of the printer 1, as an example of the image forming device according to the embodiment of the present invention.

FIG. 2 is a block diagram illustrating an example of functions of the printer 1, as an example of the image forming device according to the embodiment of the present invention.

As shown in FIG. 2, the printer 1 includes a reading unit 100, a reading control unit 110, a display unit 200, an image data storage unit 300, a data storage control unit 310, a control unit 400, an output unit 500, and an output control unit 510.

The data storage control unit 310 includes a vacant memory size determination unit 311, a vacancy waiting unit 312, a failure processing unit 313, a storage area allocation unit 314, and a read-write control unit 315.

The reading unit 100 reads image data. For example, the reading unit 100 corresponds to the scanner engine 11.

The reading control unit 110 controls the reading unit 100.

The display unit 200 displays images. For example, the display unit 200 corresponds to the operational unit 20, and is the display provided in the printer 1. The display unit 200 serves as an interface for an operator to operate the printer 1.

The image data storage unit 300 stores the image data obtained by the reading unit 100. For example, the image data storage unit 300 corresponds to the RAM 31.

The data storage control unit 310, through the vacant memory size determination unit 311, the vacancy waiting unit 312, the failure processing unit 313, the storage area allocation unit 314, and the read-write control unit 315, manages allocation of a storage area for storing image data in the image data storage unit 300. For example, the data storage control unit 310 corresponds to the RAM controller 32.

The vacant memory size determination unit 311 determines whether a vacant size of the storage area of the image data storage unit 300 is greater than a preset value.

The vacancy waiting unit 312 operates so as to wait until the vacant memory size of the image data storage unit 300 becomes greater than the preset value.

The failure processing unit 313 performs failure processing when allocation of the storage area for storing the image data in the image data storage unit 300 fails.

The storage area allocation unit 314 allocates the storage area for storing the image data in the image data storage unit 300.

The read-write control unit 315 controls operations of reading image data from the image data storage unit 300 and writing image data to the image data storage unit 300.

The control unit 400 controls the overall operations of the printer 1. For example, the control unit 400 controls operations of the CPU 41, the operational unit 20, the FAX controller 13, and the host I/F controller 14.

The output unit 500 outputs the image data stored in the image data storage unit 300. For example, the output unit 500 corresponds to the printer engine 51.

The output control unit 510 controls the output unit 500.

According to the above configuration, in the printer 1, the image data obtained by the reading unit 100 are stored in the image data storage unit 300. The image data stored in the image data storage unit 300 are output from the output unit 500. In addition, in the printer 1 of the present embodiment, the data storage control unit 310 controls allocation of the storage area for storing the image data obtained by the reading unit 100 in the image data storage unit 300.

Below, as an example, assuming the operational unit 20 serves as the display unit 200 and the RAM 31 serves as the image data storage unit 300, descriptions are primarily made of operations of the data storage control unit 310, that is, allocation of a storage area for storing image data in the image data storage unit 300.

Example of Display Unit 200

Next, the operational unit 20 is described as an example of the display unit 200.

Figure 3:
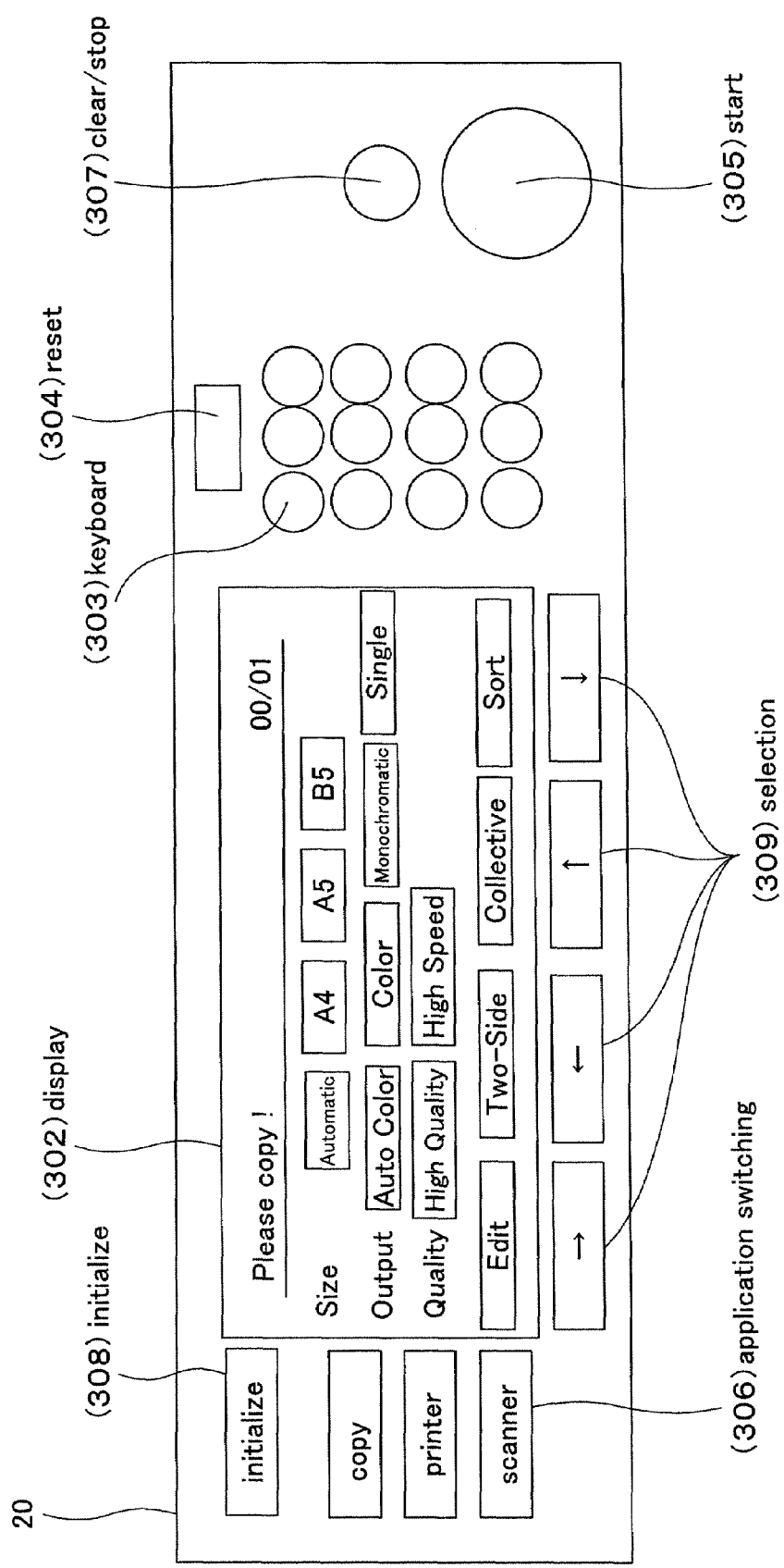
FIG. 3 is a schematic view illustrating an example of the operational unit 20, as an example of the display unit 200 according to the embodiment of the present invention.

FIG. 3 is a schematic view illustrating an example of the operational unit 20, as an example of the display unit 200 according to the embodiment of the present invention.

As shown in FIG. 3, the operational unit 20 has a display 302, a keyboard 303, a reset key 304, a start key 305, an application switching key 306, a clear/stop key 307, an initializing key 308, and selection keys 309. In FIG. 3, all the above keys are hard keys. Certainly, the present embodiment is not limited to this, but the keyboard can be a soft keyboard displayed on a liquid touch panel.

The display 302 displays characters and bitmap images. For example, the display 302 is a common display device.

The keyboard 303 is for inputting the number of copies, or other information.

The reset key 304 is used for resetting a copy mode.

The start key 305 is used to start copying or reading manuscripts.

The application switching 306 is used to switch functions of a copier, a printer, or a scanner.

The clear/stop key 307 is used to stop a copying process or to reset the number of copies.

The initializing key 308 is used to input initial settings, which are used by the copier, the printer, and the scanner, respectively.

The selection keys 309 are used to select functions displayed on the display 302.

Due to the above operational unit 20, with the display unit 200 of the image forming device of the present embodiment, the display 302 displays a graphic image, and the keyboard 303, the reset key 304, the start key 305, the application switching 306, the clear/stop key 307, and the initializing key 308 serve as an interface between an operator and the image forming device of the present embodiment.

Example of Image Data Storage Unit 300

Next, the RAM 31 is described as an example of the image data storage unit 300.

Figure 4:
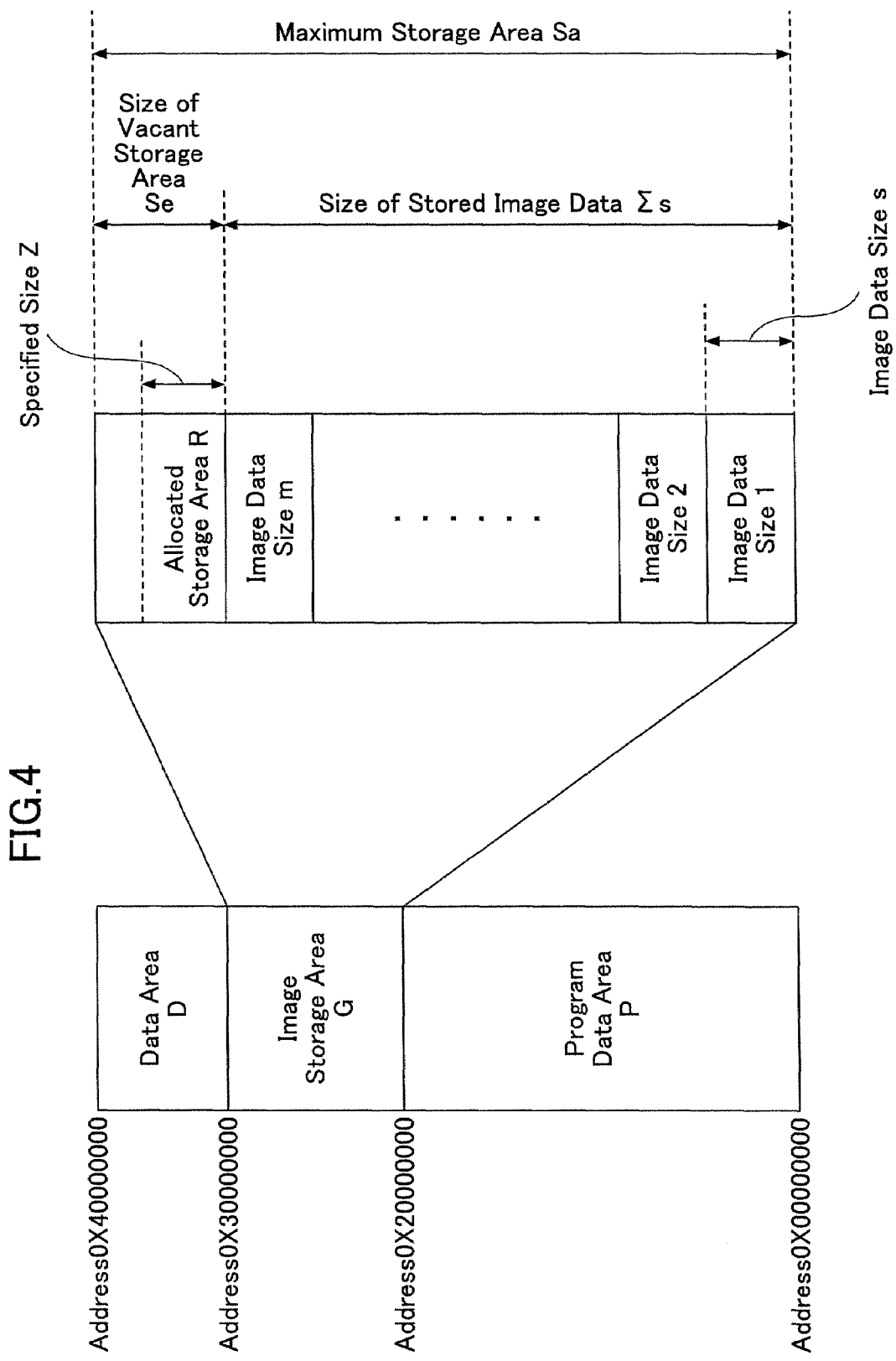
FIG. 4 is a block diagram illustrating an example of the storage area of the RAM 31, as an example of the image data storage unit 300 according to the embodiment of the present invention.

FIG. 4 is a block diagram illustrating an example of the storage area of the RAM 31, as an example of the image data storage unit 300 according to the embodiment of the present invention.

As shown in FIG. 4, the area of the RAM 31 includes a program data area P, a data area D, and an image storage area G.

The program data area P stores various application programs.

The data area D stores various settings of the printer 1 (image forming device), and calculation results generated when executing programs.

The image storage area G stores image data. For example, the image storage area G stores the image data obtained by the reading unit 100.

As shown on the right side of FIG. 4, in the image storage area G, the maximum storage area available for storing image data is represented as "maximum storage area Sa", the total size of the stored image data is represented as "size of stored image data $\Sigma S$", the size of the data of each of the stored images is represented as "image data size S", and the size of the vacant storage area is represented as "size of vacant storage area Se". It is apparent that the size of vacant storage area Se equals the difference between the maximum storage area Sa and the size of the stored image data ΣS.

The image data stored in the image storage area G may become useless along with time depending on functions of the applications like copier or scanner, or depending on output conditions of image printing or transmitting. In this case, these image data can be discarded by the data storage control unit 310. Therefore, the storage area where image data have been stored becomes vacant storage area.

In addition, in the image storage area G, the memory size required for storing image data of one page of manuscript is represented as a "specified storage size Z". The specified storage size Z is not always equal to the image data size S. For example, for compressed data, the size thereof is clear only after the compressed data are stored. In addition, the specified storage size Z may be uniquely determined according to settings of the printer 1, such as the resolution of the printer 1.

In order to store the image data, it is necessary to allocate a storage area in the image storage area G before storing the image data, and the size of the storage area to be allocated may be specified by the specified storage size Z as shown in FIG. 4. Below, the storage area to be allocated is referred to as "allocated storage area R". By allocating the storage area for storing the image data, it is possible to detect a "fully-occupied-memory" before storing the image data.

First Method of Allocating Storage Area in Image Data Storage Unit 300

Next, a first method of allocating a storage area in the image data storage unit 300 is described with reference to FIG. 5.

Figure 5:
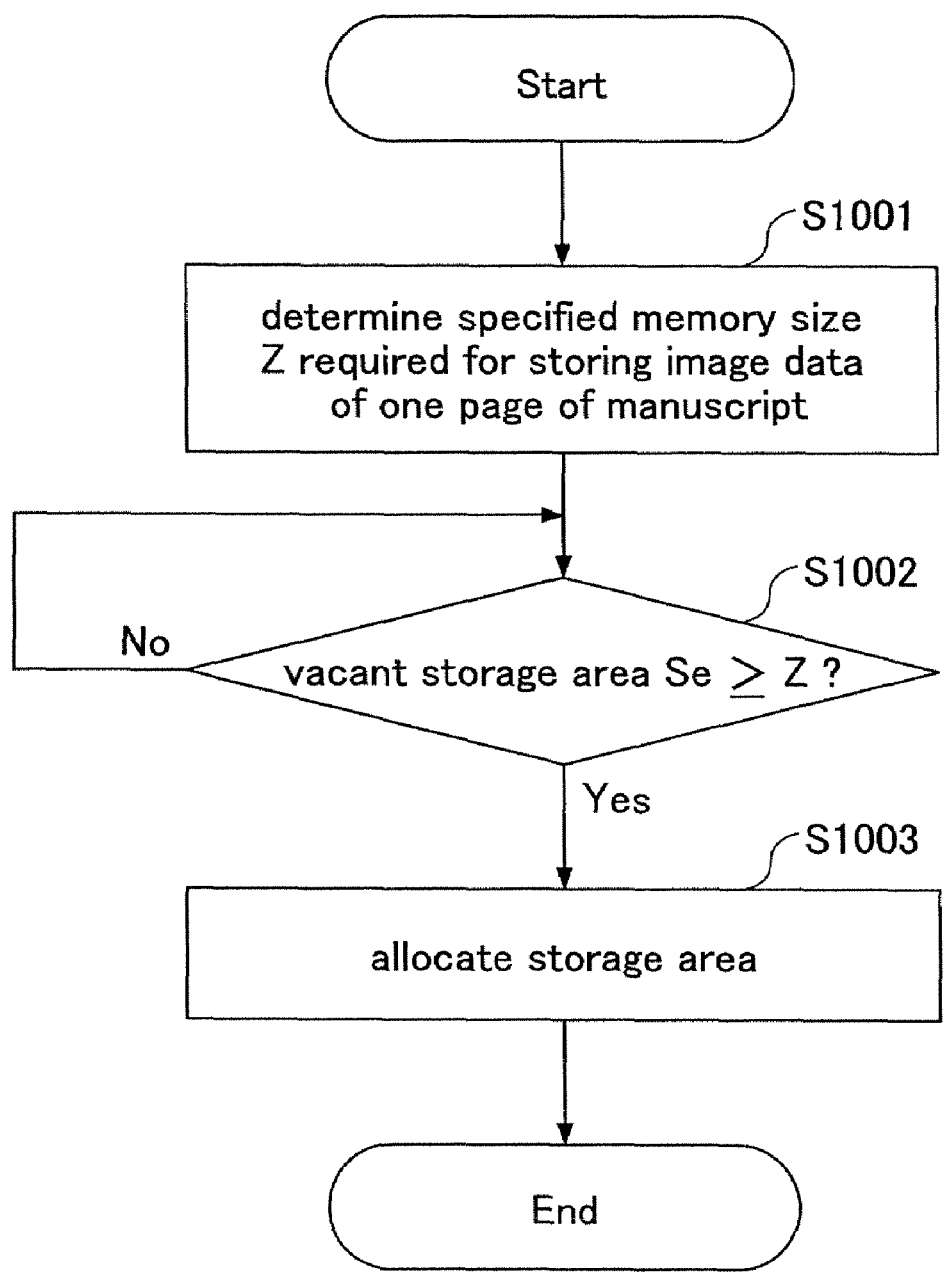
FIG. 5 is a flowchart illustrating a first example of the method of allocating a storage area in the image data storage unit 300 according to the embodiment of the present invention.

FIG. 5 is a flowchart illustrating a first example of the method of allocating a storage area in the image data storage unit 300 according to the embodiment of the present invention.

When allocating a storage area in the image storage area G for storing the image data, when it is determined that the size of the vacant storage area in the image data storage unit 300 is greater than a preset value, for example, the specified storage size Z, a storage area equivalent to the specified storage size Z is allocated. In addition, when it is determined that the size of the vacant storage area in the image data storage unit 300 is less than the preset value, for example, the specified storage size Z, the memory allocation procedure waits until the size of the vacant storage area in the image data storage unit 300 becomes equal to or greater than the specified storage size Z.

As shown in FIG. 5, in step S1001, the control unit 400 determines the specified storage size Z, which is the memory size required for storing image data of one page of manuscript. Then, the control unit 400 queries the data storage control unit 310.

In step S1002, the vacant memory size determination unit 311 determines whether the size of vacant storage area Se in the image data storage unit 300 is equal to or greater than the preset value (namely, the specified storage size Z) determined in step S1001.

If it is determined that the size of vacant storage area Se is equal to or greater than the specified storage size Z, the procedure proceeds to step S1003.

If it is determined that the size of vacant storage area Se is less than the specified storage size Z, the procedure returns to step S1002, in other words, the vacancy waiting unit 312 operates to wait until the vacant memory size of the image data storage unit 300 becomes equal to or greater than the specified storage size Z.

In step S1003, the storage area allocation unit 314 creates an allocated storage area R of the specified storage size Z in the vacant storage area in the image data storage unit 300. Therefore, a storage area is allocated in the image storage unit 300 for storing the image data of a manuscript.

According to the first method of allocating a storage area in the image data storage unit 300, when it is determined that the size of vacant storage area Se in the image storage unit 300 is equal to or greater than the specified storage size Z, the storage area R having a size of the specified storage size Z is allocated; when it is determined that the size of the vacant storage area Se is less than the specified storage size Z, the procedure stops for a while to wait until the vacant memory size of the image data storage unit 300 becomes equal to or greater than the specified storage size Z.

Second Method of Allocating Storage Area in Image Data Storage Unit 300

Below, a second method of allocating a storage area in the image data storage unit 300 is described with reference to FIG. 6.

Figure 6:
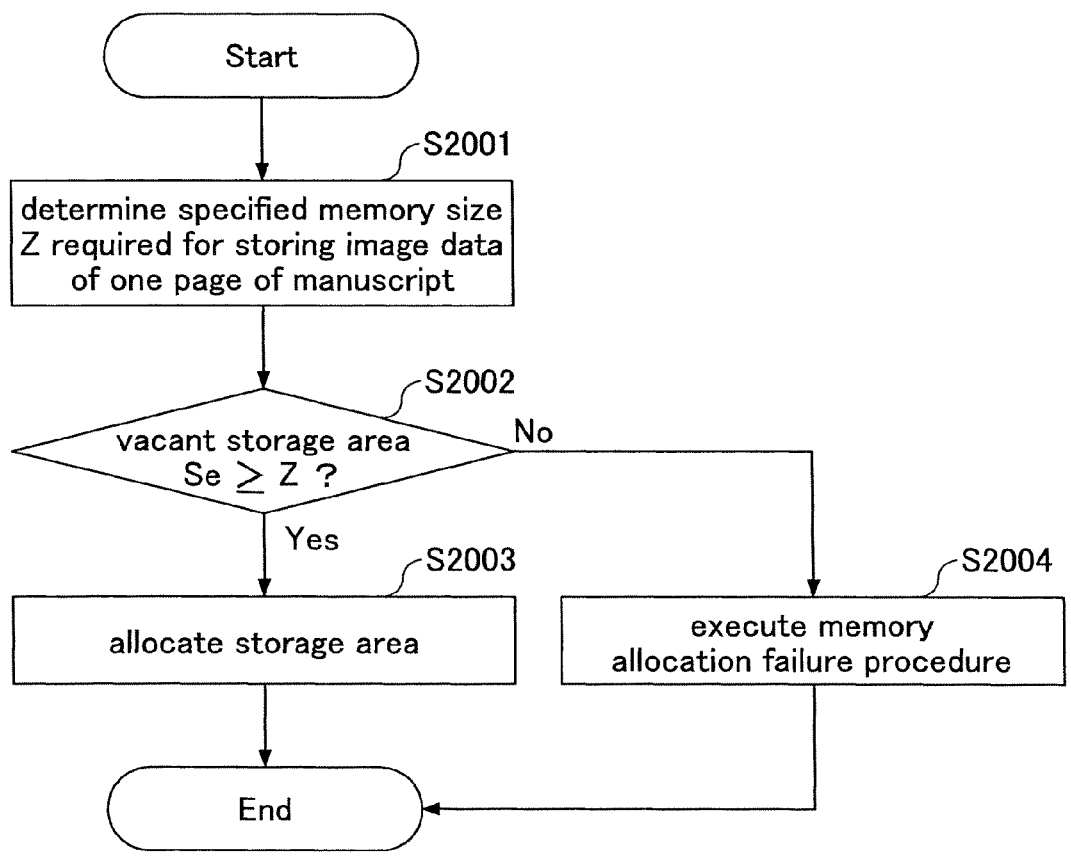
FIG. 6 is a flowchart illustrating a second example of the method of allocating a storage area in the image data storage unit 300 according to the embodiment of the present invention.

FIG. 6 is a flowchart illustrating a second example of the method of allocating a storage area in the image data storage unit 300 according to the embodiment of the present invention.

In the first method of allocating a storage area, when it is determined that the size of the vacant storage area Se is less than the specified storage size Z, the procedure stops for a while to wait until the vacant memory size becomes equal to or greater than the specified storage size Z.

In the second method, when it is determined that the size of the vacant storage area Se is less than the specified storage size Z, a memory allocation failure process is executed.

As shown in FIG. 6, in step S2001, the control unit 400 determines the specified storage size Z, which is the memory size required for storing image data of one page of manuscript. Then, the control unit 400 queries the data storage control unit 310.

In step S2002, the vacant memory size determination unit 311 determines whether the size of vacant storage area Se in the image data storage unit 300 is equal to or greater than the preset value (namely, the specified storage size Z) determined in step S2001.

If it is determined that the size of vacant storage area Se is equal to or greater than the specified storage size Z, the procedure proceeds to step S2003.

If it is determined that the size of vacant storage area Se is less than the specified storage size Z, the procedure proceeds to step S2004.

In step S2003, the storage area allocation unit 314 creates an allocated storage area R of the specified storage size Z in the vacant storage area in the image data storage unit 300. Therefore, a storage area is allocated in the image storage unit 300 for storing the image data of a manuscript.

In step S2004, the failure processing unit 313 identifies that the memory allocation procedure fails, and a memory allocation failure process is executed.

According to the second method of allocating a storage area in the image data storage unit 300, when it is determined that the size of the vacant storage area Se is less than the specified storage size Z, the memory allocation failure process is executed.

Example 1 of Operations of Printer 1

Below, an example of operations of the printer 1 is described with reference to FIG. 7.

Figure 7:
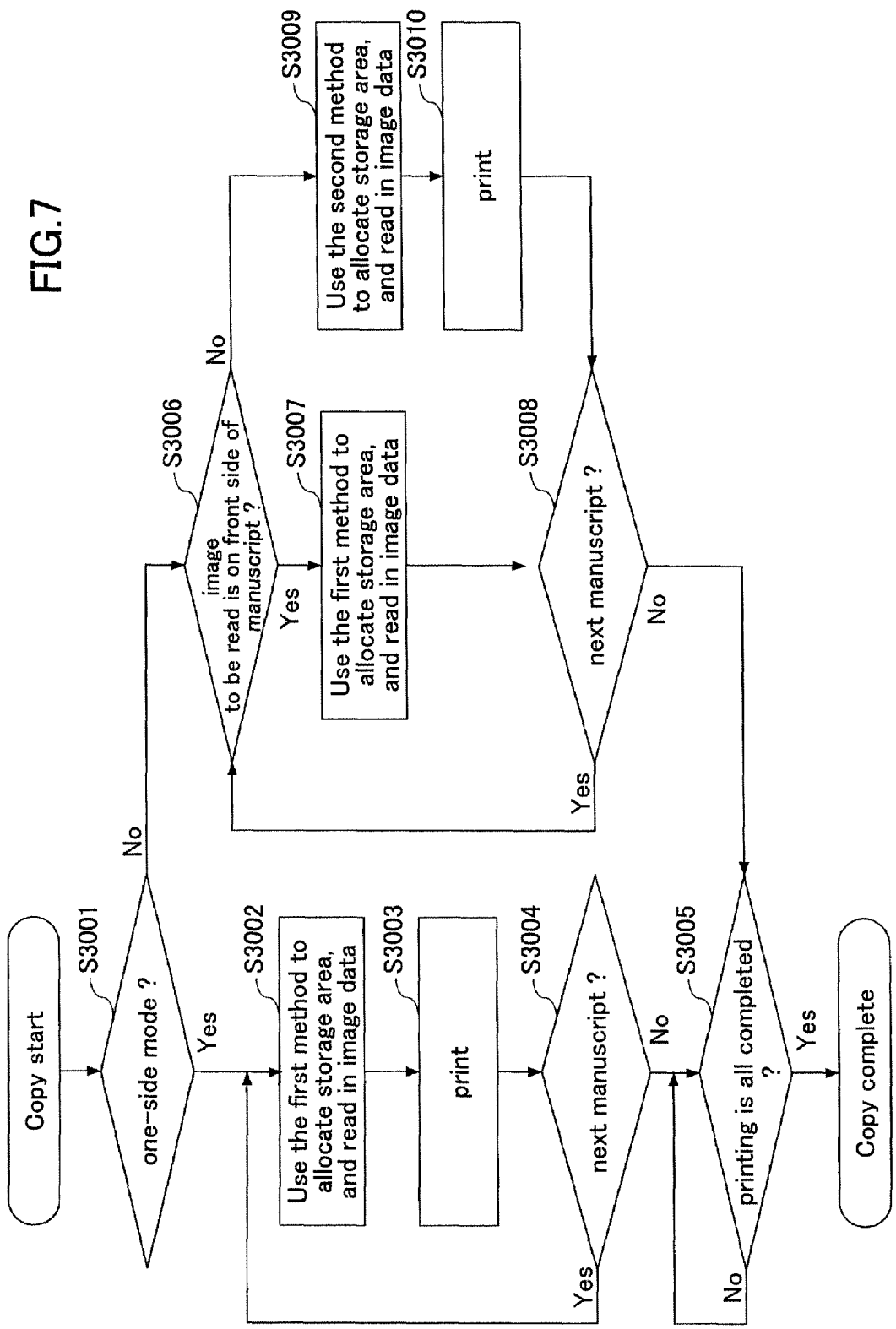
FIG. 7 is a flowchart illustrating an example of the operations of the printer 1, as an example of the image forming device of the embodiment of the present invention.

FIG. 7 is a flowchart illustrating an example of the operations of the printer 1, as an example of the image forming device of the embodiment of the present invention.

In this example, the first method or the second method for allocating a storage area in the image data storage unit 300 is selected depending on the current printing mode of the printer 1, namely, a one-side mode or a two-side mode.

As shown in FIG. 7, in step S3001, the control unit 400 determines the current printing mode of the printer 1, that is, a one-side mode or a two-side mode.

If it is determined that the current printing mode of the printer 1 is the one-side mode, the procedure proceeds to step S3002.

If it is determined that the current printing mode of the printer 1 is the two-side mode, the procedure proceeds to step S3006.

In step S3002, the control unit 400 selects the first method to allocate a storage area in the image data storage unit 300. That is, the control unit 400 directs the data storage control unit 310 to wait until the vacant memory size becomes equal to or greater than the specified storage size Z when it is determined that the size of the vacant storage area Se is less than the specified storage size Z. Since operations performed in step S3002 are the same as those described in FIG. 5, detailed explanations are omitted.

In step S3003, the output unit 500 outputs the image data stored in the image data storage unit 300 in the one-side mode.

In step S3004, the reading control unit 110 determines whether unread manuscripts exist.

If it is determines that unread manuscripts exist, the routine returns to step S3002.

If it is determines that unread manuscripts do not exist, the routine proceeds to step S3005.

In step S3005, the control unit 400 determines whether the printing output process by the output control unit 510 is completed.

If it is determines that the printing output process is completed, the routine is finished.

If it is determines that the printing output process is not completed, the routine returns to step S3005 again.

In step S3006, the control unit 400 determines whether the image to be read is on a front side of a manuscript.

If it is determined that the image to be read is on the front side of the manuscript, the procedure proceeds to step S3007.

If it is determined that the image to be read is not on the front side of the manuscript, namely, the image is on the back side of the manuscript, the procedure proceeds to step S3009.

The operations performed in step S3006 by the control unit 400 are explained in detail below.

In step S3007, the same as step S3002, the control unit 400 selects the first method to allocate a storage area in the image data storage unit 300. That is, the control unit 400 directs the data storage control unit 310 to wait until the vacant memory size becomes equal to or greater than the specified storage size Z when it is determined that the size of the vacant storage area Se is less than the specified storage size Z.

In step S3008, the reading control unit 110 determines whether unread manuscripts exist.

If it is determines that unread manuscripts exist, the routine returns to step S3006.

If it is determines that unread manuscripts do not exist, the routine proceeds to step S3005.

In step S3009, the control unit 400 selects the second method to allocate a storage area in the image data storage unit 300. That is, when it is determined that the size of the vacant storage area Se is less than the specified storage size Z, the memory allocation failure process is executed.

In step S3010, the output unit 500 outputs the image data stored in the image data storage unit 300 in the two-side mode.

Then, the routine proceeds to step S3008.

By repeating the above procedure, in the printer 1 operating as in the example 1, when the printer 1 is in the one-side printing mode (in other words, the image forming condition is the one-side printing mode), or when the printer 1 is in the two-side printing mode (in other words, the image forming condition is the two-side printing mode), but the image to be read is on the front side of the manuscript, the first method is selected to allocate the storage area in the image data storage unit 300. On the other hand, when the printer 1 is in the two-side printing mode (in other words, the image forming condition is the two-side printing mode), but the image to be read is on the back side of the manuscript, the second method is selected to allocate the storage area in the image data storage unit 300.

In other words, depending on the conditions of making copies, the situations are different. Sometimes, when outputting the image data stored in the image data storage unit 300 to a sheet material, it is not necessary to maintain the memory space for the image data any longer, and after waiting until a vacant storage area appears, more image data can be stored, and the copy process can proceed. For example, this is true when the printer 1 is in the one-side printing mode, or in the two-side printing mode but the image is output to the front side of the sheet material. On the other hand, sometimes, it is un-helpful to wait for a vacant storage area; for example, this is true when the printer 1 is in the two-side printing mode but the image is output to the back side of the sheet material.

Therefore, as in the present example, by appropriately employing the first method, which waits for a vacant storage area for memory allocation, and the second method, which does not wait for a vacant storage area but executes a memory allocation failure process, depending on the copy conditions, it is not necessary to stop operations to wait for occurrence of a vacant storage area, and this may improve utilization efficiency of the memory, and prevent full occupation of a memory.

Next, the operations performed in step S3006 by the control unit 400 are explained with reference to FIG. 8.

Figure 8:
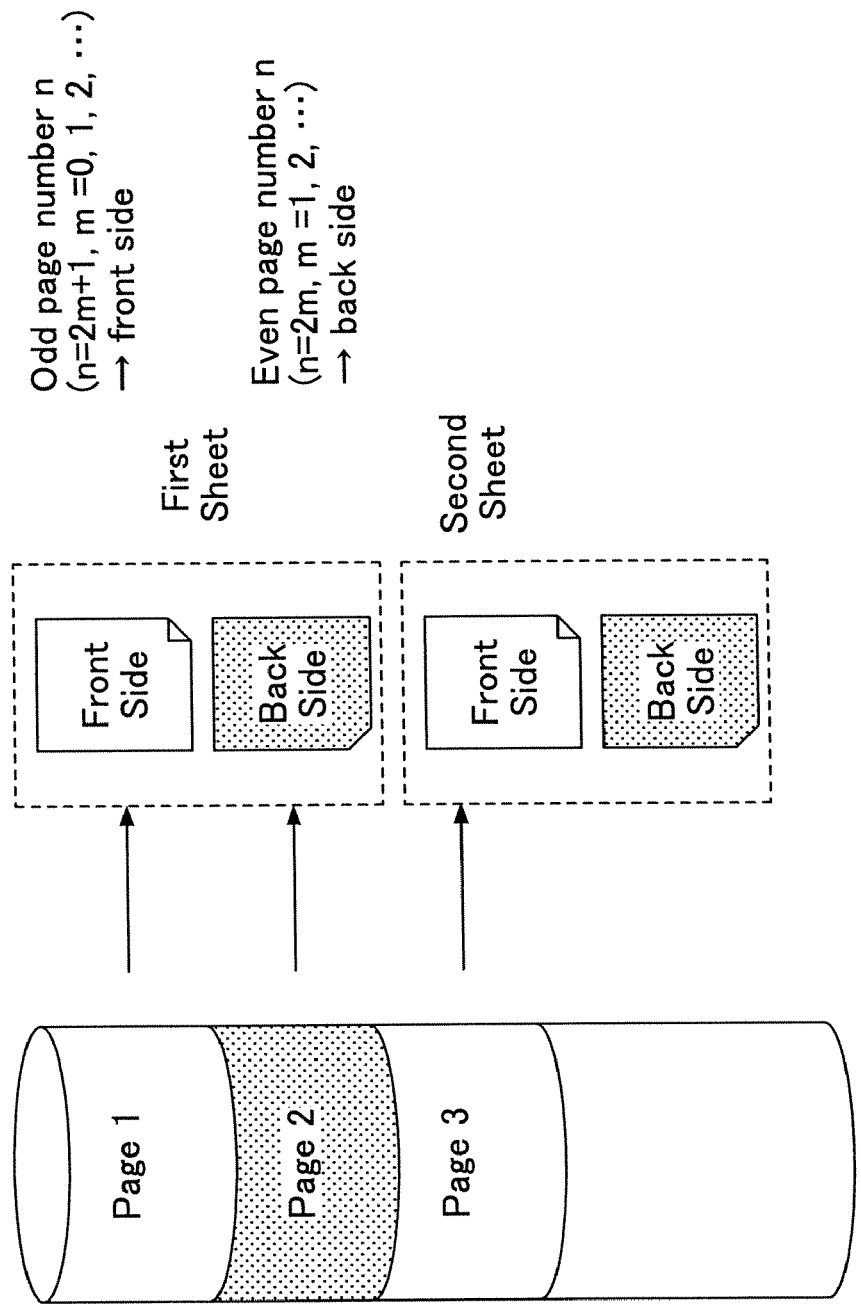
FIG. 8 is a schematic view illustrating relationships of locations (front side or back side) of the image on a manuscript.

FIG. 8 is a schematic view illustrating relationships of locations (front side or back side) of the image on a manuscript.

As shown in FIG. 8, in step S3006, when the image to be read has an odd page number ($n=2m+1$, m is an integer, and $m \geq 0$), the control unit 400 determines the image is on the front side of a manuscript; whereas when the image to be read has an even page number ($n=2m$, m is an integer, and $m \geq 1$), the control unit 400 determines the image is on the back side of a manuscript. In this way, the control unit 400 determines the location (front side or back side) of the image to be read on a manuscript.

Example 2 of Operations of Printer 1

Below, another example of operations of the printer 1 is described with reference to FIG. 9.

Figure 9:
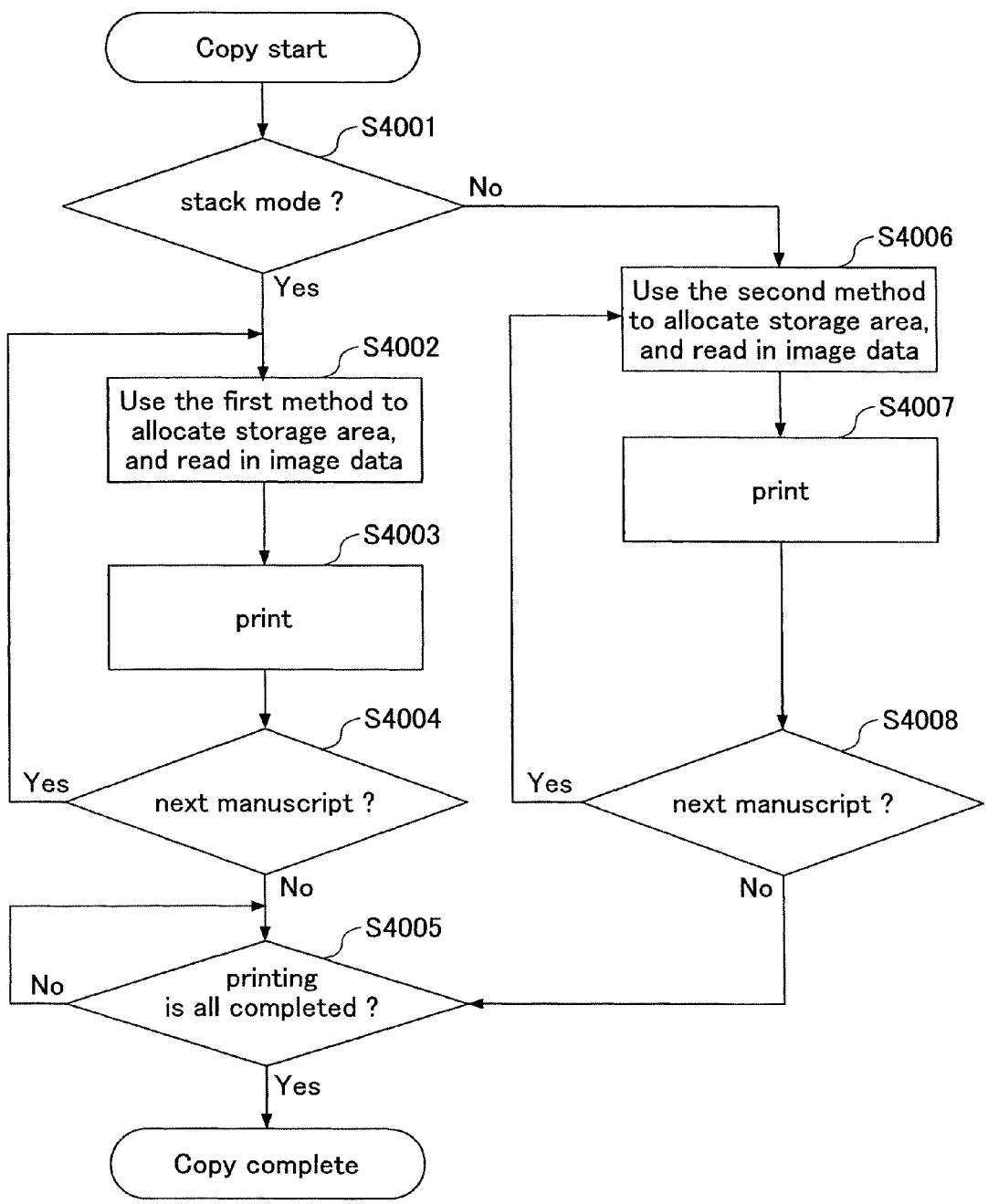
FIG. 9 is a flowchart illustrating a second example of the operations of the printer 1, as an example of the image forming device of the embodiment of the present invention.

FIG. 9 is a flowchart illustrating a second example of the operations of the printer 1, as an example of the image forming device of the embodiment of the present invention.

In this example, the first method or the second method for allocating a storage area in the image data storage unit 300 is selected depending on a printing mode (image forming condition) of a sort mode or a stack mode.

As shown in FIG. 9, in step S4001, when a copy operation starts, the control unit 400 determines the current printing mode of the printer 1, that is, a sort mode or a stack mode.

If it is determined that the current printing mode of the printer 1 is the stack mode, the procedure proceeds to step S4002.

If it is determined that the current printing mode of the printer 1 is the sort mode, the procedure proceeds to step S4006.

In step S4002, the control unit 400 selects the first method to allocate a storage area in the image data storage unit 300.

In step S4003, the output unit 500 outputs the image data stored in the image data storage unit 300 in the stack mode.

In step S4004, the reading control unit 110 determines whether unread manuscripts exist.

In step S4005, the control unit 400 determines whether the printing process by the output control unit 510 is all completed.

In step S4006, the control unit 400 selects the second method to allocate a storage area in the image data storage unit 300.

In step S4007, the output unit 500 outputs the image data stored in the image data storage unit 300 in the two-side mode.

In step S4008, the reading control unit 110 determines whether unread manuscripts exist.

If it is determined that unread manuscripts exist, the routine returns to step S4006.

If it is determined that unread manuscripts do not exist, the routine proceeds to step S4005.

By repeating the above procedure, in the printer 1 operating as in the example 2, when the printer 1 is in the stack mode (in other words, the image forming condition is set to be the stack mode), the first method is selected to allocate the storage area in the image data storage unit 300, and when the printer 1 is in the sort mode (in other words, the image forming condition is set to be the sort mode), the second method is selected to allocate the storage area in the image data storage unit 300.

In other words, depending on the conditions of making copies, the situations are different. Sometimes, when outputting image data stored in the image data storage unit 300 to a sheet, it is not necessary to maintain the memory space for the image data any longer, and after waiting until a vacant storage area appears, more image data can be stored and the copy process can proceed. For example, this is true when the printer 1 is in the stack mode. On the other hand, sometimes, it is un-helpful to wait for a vacant storage area, for example, when in the sort mode.

Therefore, as in the present example, by appropriately employing the first method, which waits for a vacant storage area for memory allocation, and the second method, which does not wait for a vacant storage area but executes a memory allocation failure process, depending on the copy conditions, it is not necessary to stop operations to wait for occurrence of a vacant storage area, and this may improve utilization efficiency of the memory, and prevent full occupation of a memory.

Example 3 of Operations of Printer 1

Below, a third example of operations of the printer 1 is described with reference to FIG. 10.

Figure 10:
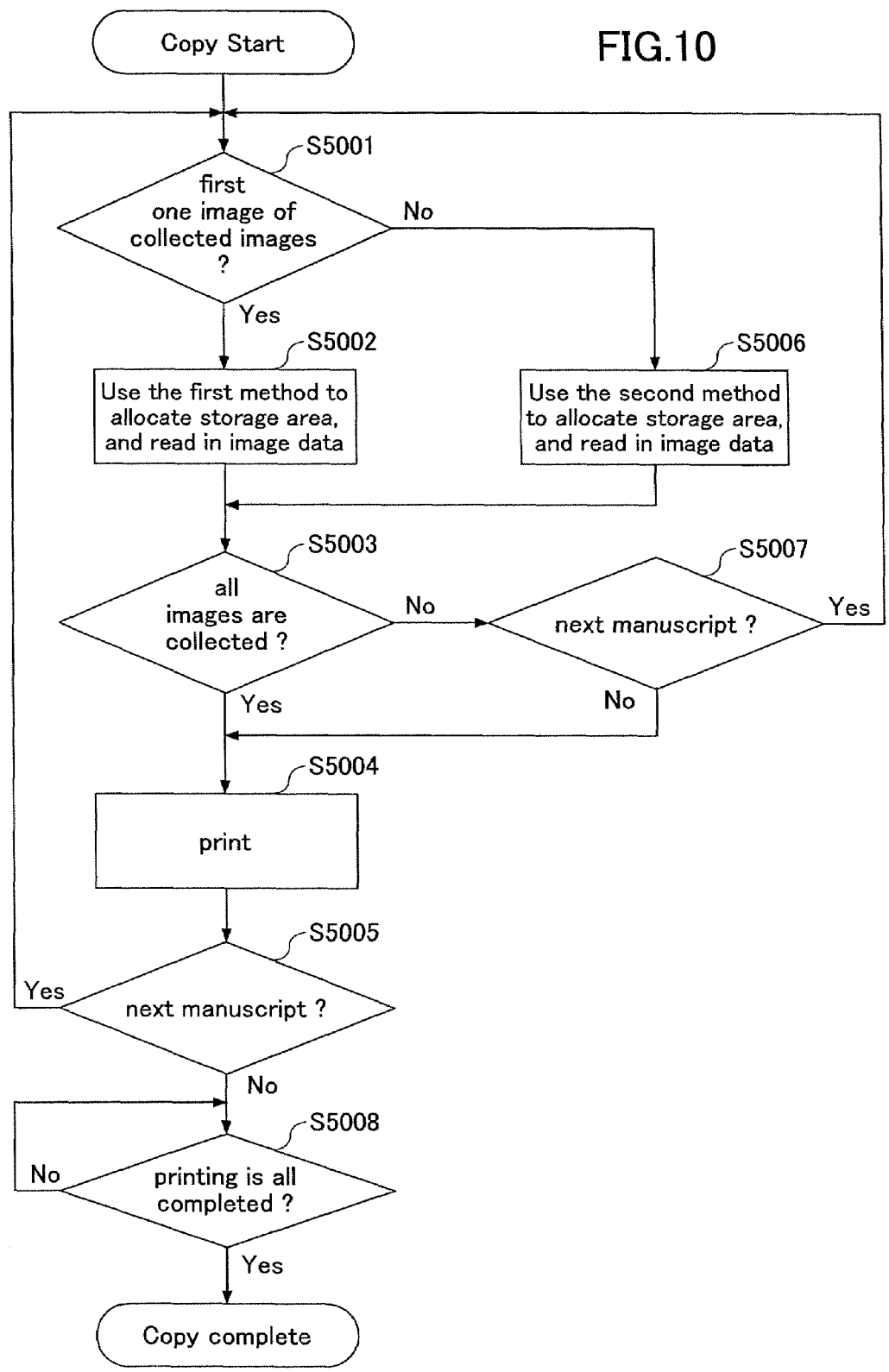
FIG. 10 is a flowchart illustrating a third example of the operations of the printer 1, as an example of the image forming device of the embodiment of the present invention.

FIG. 10 is a flowchart illustrating a third example of the operations of the printer 1, as an example of the image forming device of the embodiment of the present invention.

In this example, the printer 1 is set in advance in a collective printing mode, in which plural image data sets are collected for printing. In this example, the first method or the second method for allocating a storage area in the image data storage unit 300 is selected depending on whether an image to be read is the first one of the images to be collected.

As shown in FIG. 10, in step S5001, when a copy operation starts, the control unit 400 determines whether the current image is the first one of the images to be collected.

If it is determined that the current image is the first one of the images to be collected, the procedure proceeds to step S5002.

If it is determined that the current image is not the first one of the images to be collected, the procedure proceeds to step S5006.

In step S5002, the control unit 400 selects the first method to allocate a storage area in the image data storage unit 300. That is, the control unit 400 directs the data storage control unit 310 to wait until the vacant memory size becomes equal to or greater than the specified storage size Z so as to allocate a storage area. Since operations of the first method are the same as described previously, detailed explanations are omitted.

In step S5003, the control unit 400 determines whether a specified number of images to be collected are all collected.

If it is determined that the specified number of images to be collected are all collected, the procedure proceeds to step S5004.

If it is determined that the specified number of images to be collected are not all collected, the procedure proceeds to step S5007.

In step S5004, the output unit 500 outputs the image data stored in the image data storage unit 300.

In step S5005, the reading control unit 110 determines whether unread manuscripts exist.

If it is determined that unread manuscripts exist, the routine returns to step S5001.

If it is determined that unread manuscripts do not exist, the routine proceeds to step S5008.

In step S5006, the control unit 400 selects the second method to allocate a storage area in the image data storage unit 300.

In step S5007, the reading control unit 110 determines whether unread manuscripts exist.

If it is determined that unread manuscripts exist, the routine returns to step S5001.

If it is determined that unread manuscripts do not exist, the routine proceeds to step S5004.

In step S5008, the control unit 400 determines whether the printing process by the output control unit 510 is all completed.

By repeating the above procedure, in the printer 1 operating as in the example 3, when the current image is the first one of the images to be collected, the first method is selected to allocate the storage area in the image data storage unit 300. When the current image is not the first one of the images to be collected, the second method is selected to allocate the storage area in the image data storage unit 300.

In other words, depending on the conditions of making copies, the situations are different. Sometimes, when outputting image data stored in the image data storage unit 300 to a sheet material, it is not necessary to maintain the memory space for the image data any longer, and after waiting until a vacant storage area appears, more image data can be stored, and the copy process can proceed. For example, this is true when the current image is the first one of the images to be collected. On the other hand, sometimes, it is un-helpful to wait for a vacant storage area, for example, when the current image is not the first one of the images to be collected.

Therefore, as in the present example, by appropriately employing the first method, which waits for a vacant storage area for memory allocation, and the second method, which does not wait for a vacant storage area but executes a memory allocation failure process, depending on the copy conditions, it is not necessary to stop operations to wait for occurrence of a vacant storage area; this may improve utilization efficiency of the memory and prevent full occupation of the memory.

Next, the operations performed in step S2004 in FIG. 6 by using the second method for memory allocation are explained with reference to FIG. 11 and FIG. 12.

Figure 11:
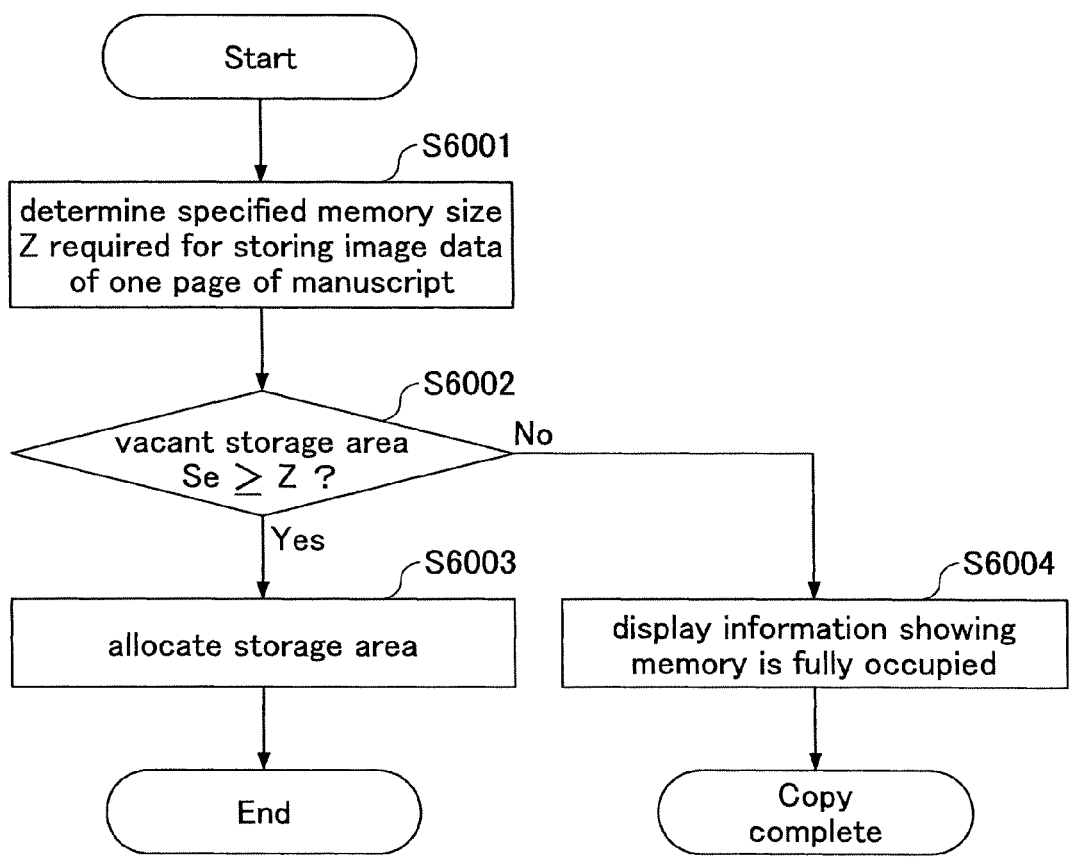
FIG. 11 is a flowchart illustrating the operations performed in step S2004 in FIG. 6 by using the second method for allocating a storage area in the image data storage unit 300 according to the embodiment of the present invention.

FIG. 11 is a flowchart illustrating the operations performed in step S2004 in FIG. 6 by using the second method for allocating a storage area in the image data storage unit 300 according to the embodiment of the present invention.

As shown in FIG. 11, in step S6001, the control unit 400 determines the specified storage size Z, which is the memory size required for storing image data of one page of manuscript. Then, the control unit 400 queries the data storage control unit 310.

In step S6002, the vacant memory size determination unit 311 determines whether the size of vacant storage area Se in the image data storage unit 300 is equal to or greater than the preset value (namely, the specified storage size Z) determined in step S6001.

If it is determined that the size of vacant storage area Se is equal to or greater than the specified storage size Z, the procedure proceeds to step S6003.

If it is determined that the size of vacant storage area Se is less than the specified storage size Z, the procedure proceeds to step S6004.

In step S6003, the storage area allocation unit 314 creates an allocated storage area R of the specified storage size Z in the vacant storage area in the image data storage unit 300. Therefore, a storage area is allocated in the image storage unit 300 for storing the image data of a manuscript.

In step S6004, the control unit 400 displays information on the display unit 200, indicating that the vacant storage area is not sufficient, namely, the memory is fully occupied.

For example, the information shown in FIG. 12 can be displayed on the display unit 200.

FIG. 12 is a table illustrating the operations of the failure processing unit 313 according to the embodiment of the present invention.

As shown in FIG. 12, messages related to image forming conditions like the two-side mode (example 1), the stack mode (example 2), the collective mode (example 3) can be displayed on the display unit 200.

After the step S6004, the routine is finished.

Therefore, since a notification is sent to users that copy operations can be performed without occurrence of full-memory occupation if the image forming condition is changed, the user it urged to change the image forming condition to continue the copy operations; thereby, it is possible to improve operation efficiency of devices, and to guide users to conditions enabling copy operations with occurrence of full memory occupation.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Applications No. 2006-280674 filed on Oct. 13, 2006, the entire contents of which are hereby incorporated by reference.

What is claimed is:

1. An image forming device, comprising:
a reading unit configured to read image data;
an image data storage unit configured to store the image data obtained by the reading unit;
a vacancy waiting unit configured to, when allocating a storage area for storing the image data in the image data storage unit, wait until a storage size of a vacancy in the image data storage unit becomes greater than a predetermined value when allocation of the storage area fails;
a failure processing unit configured to, when allocating the storage area for storing the image data in the image data storage unit, display a failure message when allocation of the storage area fails; and
a control unit configured to determine an image forming condition in the image forming device, and to select, based on the determined image forming condition, between a first method and a second method to be performed in a case of the failure in the allocation of the storage area, the first method causing the vacancy waiting unit to wait until the storage size of the vacancy in the image data storage unit becomes greater than the predetermined value and the second method causing the failure processing unit to display the failure message.

2. The image forming device as claimed in claim 1, wherein
the image forming device has a one-side printing mode and a two-side printing mode;
the control unit selects the vacancy waiting unit when the image forming device is set in the one-side printing mode, and the image forming condition of the image forming device is set for the two-side printing and the image data are to be printed on a front side; and
the control unit selects the failure processing unit when the image forming device is in the two-side printing mode and the image data are to be printed on a back side.

3. The image forming device as claimed in claim 1, wherein
the image forming device has a sort mode and a stack mode,
the control unit selects the vacancy waiting unit when the image forming device is in the stack mode, and
the control unit selects the failure processing unit when the image forming device is in the sort mode.

4. The image forming device as claimed in claim 1, wherein
the image forming device has a collective mode for collecting and outputting the image data,
the control unit selects the vacancy waiting unit when an image to be read is the first one of images to be collected, and
the control unit selects the failure processing unit when an image to be read is not the first one of the images to be collected.

5. The image forming device as claimed in claim 1, wherein the predetermined value is a storage size corresponding to a size of the read image data.

6. The image forming device as claimed in claim 1, wherein the determination by the control unit is based on whether the image forming condition allows image data stored in the storage unit previous to the read image data to be discarded once the previously stored image data is output to a sheet material.

* * * * *